(12) United States Patent
Zuberec et al.

(10) Patent No.: US 6,965,863 B1
(45) Date of Patent: Nov. 15, 2005

(54) SPEECH RECOGNITION USER INTERFACE

(75) Inventors: Sarah E. Zuberec, Seattle, WA (US); Cynthia DuVal, Shoreline, WA (US); Benjamin N. Rabelos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 09/191,047

(22) Filed: Nov. 12, 1998

(51) Int. Cl.[7] .................. G10L 21/00; G10L 15/00; G10L 21/06; G10L 15/04
(52) U.S. Cl. .................. 704/270; 704/231; 704/276; 704/251
(58) Field of Search .................. 704/270, 275, 704/231, 246, 251, 276

(56) References Cited

U.S. PATENT DOCUMENTS

| | | | | |
|---|---|---|---|---|
| 5,774,841 A | * | 6/1998 | Salazar et al. ............ | 704/225 |
| 6,012,030 A | * | 1/2000 | French-St. George et al. ... | 704/275 |
| 6,018,711 A | * | 1/2000 | French-St. George et al. ... | 704/275 |
| 6,075,534 A | * | 6/2000 | VanBuskirk et al. ........ | 345/348 |

* cited by examiner

Primary Examiner—Angela Armstrong
(74) Attorney, Agent, or Firm—Lee & Hayes, PLLC (57) ABSTRACT

A speech recognition system having a user interface that provides both visual and auditory feedback to a user. The user interface includes an audio sound or speech generator that produces three distinct sounds: an "on" sound signifying that the speech recognition system is on and actively awaiting vocal input; an "off" sound indicating that the speech recognition system is off and in a sleep mode; and a "confirm" sound noting that an utterance has been recognized. The "on" sound is triggered by a key "wake up" command or by depression of button. Once awake, the speech recognition engine expects to receive an utterance within a predetermined response time. The "confirm" sound signals the start of the response time. If the response time lapses before a recognizable utterance is entered, the "off" sound is played. The user interface further includes a visual component in the form of a graphic that changes with the tolling of the response period. In one implementation, the count graphic is a progress bar that counts down or shortens in proportion to the passage of the response period. When the response time runs out, the progress bar disappears entirely. On the other hand, if the speech engine recognizes an utterance within the response period, the user interface plays the "confirm" sound and restarts the countdown graphic. The user interface may also change the color of the graphic elements briefly to reflect a correct voice entry.

34 Claims, 7 Drawing Sheets

SPEECH RECOGNITION USER INTERFACE

TECHNICAL FIELD

This invention relates to speech recognition systems. More particularly, this invention relates to user interfaces for speech recognition systems. This invention further relates to vehicle computer systems and other electronic devices that implement such speech recognition user interfaces. This invention further relates to methods and systems for facilitating communication between people through a device.

BACKGROUND

Two common types of speech recognition systems are continuous and discrete. Continuous speech recognition systems detect and discern useful information from continuous speech patterns. In use, an operator may speak phrases and sentences without pausing and the continuous speech recognition system will determine the words being spoken. Continuous speech recognition systems are used, for example, in voice-input word processors that enable operators to dictate letters directly to the computer.

Discrete speech recognition systems are designed to detect individual words and phrases that are interrupted by intentional pauses, resulting in an absence of speech between the words and phrases. Discrete speech recognition systems are often used in "command and control" applications in which an operator speaks individual commands to initiate corresponding predefined control functions. In a typical use, the operator speaks a command, pauses while the system processes and responds to the command, and then speaks another command. The system detects each command and performs the associated function.

In all speech recognition systems, various forms of feedback are used to indicate to the user when the system is active and ready for speech input. In many PC based systems, feedback is provided by means of onscreen visual elements. As an example, in some commercially available dictation systems, an icon is present and flashing indicating to the user that he/she can begin dictation. Text appears on screen as spoken words begin to be recognized. In this case, users are trained that they can speak at any time until they actively shut the recognition system off.

In data access systems, feedback is provided by spoken or audio prompts. As an example, feedback can be modeled after a conversation. The system speaks a key word or phrase, followed by a pause. It is after this pause that the user must respond with their chosen command. In this example, users are trained that they must speak after the pause and before the system times out.

Not all environments that employ a speech recognition system have the luxury of providing such clean exchanges between the system and user (i.e., knowing when the system speaks and when the user speaks). In some environments, users are concentrating on a primary task and using speech as a method of input because their hands and eyes are otherwise occupied. In this situation, feedback needs to be quick and succinct, requiring little attention from the user.

Speech interface systems can be designed to be always awake and available to accept speech commands from the user. This is very much like how two people hold a conversation. Even if one person is talking, they can still hear responses from the other person. Both talking and listening can be done at the same time. While this is a natural style of interaction, technical limitations of certain speech systems do not allow it. In many cases, if the system is always awake, it may recognize any extraneous sound it hears. For instance, if a speech system in a car is always listening for all speech commands while the radio is playing, the system may pick up words from the radio and carry out actions not intended by the vehicle operator. This is confusing and frustrating for the operator.

To avoid this potentially confusing situation, speech systems can be designed to be awake for limited periods of time and when awake, to utilize limited sets of recognizable words. A complete list of recognized words or phrases is referred to as the "vocabulary", and a subset of the vocabulary that the recognition system is attempting to detect at any one time is known as the "grammar." In general, the smaller the active grammar, the more reliable the recognition because the system is only focusing on a few words or phrases. Conversely, the larger the active grammar, the less reliable the recognition because the system is attempting to discern a word or phrase from many words or phrases.

Once a command is given and accepted by the system, the user is given a predefined time limit to speak other commands in the grammar before the system goes back to sleep and stops accepting commands. Since the system is initially listening for only one or two commands, random and unwanted recognition of extraneous words is greatly reduced. However, operating a speech system that has sleep and active modes, as well as changing grammars, can be difficult and/or confusing to the operator in the absence of some form of feedback.

Accordingly, there is a need for speech recognition user interfaces to guide operators through the various states and options of the speech system by using cues that can be readily ascertained by the user in a casual hands-free, at a glance environment.

Another problem contemplated by the inventors concerns other types of communications that rely on asynchronous messages. For example, video conferencing, teleconferencing, and certain network-based software provide a distributed collaboration environment in which two or more people collaborate. In such situations, it is difficult to tell in some remote collaboration software that a person at one of site has tried to break into the conversation.

In this distributed collaboration environment, common face-to-face cues that people intuitively rely on to know when to enter into the conversation may not be available. The video may be blurry, or not all participants are visible, or other problems may prevent traditional conversational cues.

Accordingly, there is a need for a system that provides visual and/or auditory cues to facilitate distributed communications where traditional visual feedback is unattainable for technical and other reasons.

SUMMARY

This invention concerns a speech recognition system having a user interface that provides both visual and auditory feedback to guide a user in a casual, eyes-off environment. The speech recognition (SR) system includes an application, a vocabulary accessible by the application that holds a set of utterances applicable to the application, and a speech recognition engine to recognize the utterances in the vocabulary. The user interface provides feedback to inform a user when the speech recognition engine is awaiting vocal input and to confirm when an utterance is recognized.

The user interface includes an audio sound or speech generator that produces three distinct sounds: a SR "on" sound signifying that the system is on and actively awaiting vocal input; an "off" sound indicating that the SR system is off and in a sleep mode; and a "confirm" sound noting that an utterance has been recognized. The "on" sound is triggered by a key "wake up" command or by depression of button. Once awake, the speech recognition engine expects to receive an utterance within a predetermined response time. The "confirm" sound signals the start of the response time. If the response time lapses before a recognizable utterance is entered, the "off" sound is played.

The user interface further includes a visual component in the form of a graphic that changes with the tolling of the response period. In one implementation, the count graphic is a progress bar that counts down or shortens in proportion to the diminishment of the response period. When the response time runs out, the progress bar disappears entirely. On the other hand, if the speech engine recognizes an utterance within the response period, the user interface plays the "confirm" sound and restarts the countdown graphic. The user interface may also temporarily change the color of the graphic elements from one color to another and then back to the original color to reflect a correct voice entry.

The user interface may also be used in distributed collaboration efforts to facilitate conversations between remotely located people. The visual display tells a user when they can speak and how long they can speak before their turn "times out."

DETAILED DESCRIPTION

This invention concerns speech recognition systems and user interfaces for such systems. The invention is described in the context of a discrete speech recognition system. However, aspects of the invention can be applied to continuous speech recognition systems as well. Moreover, this invention may be utilized in a distributed collaboration system (e.g., video conferencing, teleconferencing, collaboration software, etc.).

Figure 1:
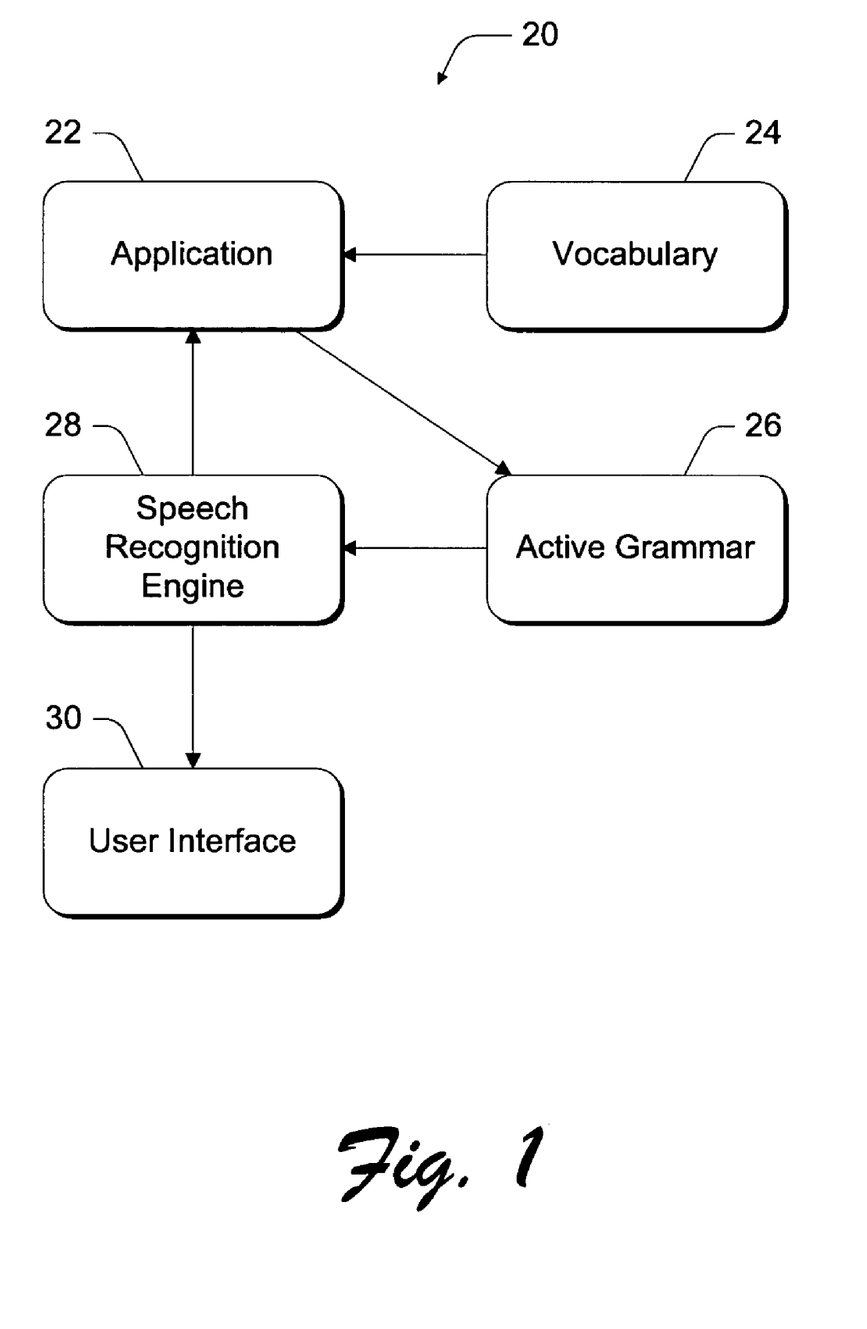
FIG. 1 is a functional block diagram of a discrete speech recognition system.

FIG. 1 shows a discrete speech recognition system 20 that recognizes individual words or phrases. As used herein, the term "utterances" means a word, phrase, or other spoken sound that is detectable as a voice input to the speech recognition system. The discrete speech recognition system 20 includes an application 22, a vocabulary 24, an active grammar 26, a speech recognition engine 28, and a user interface 30. The application may be essentially any kind of application that supports voice-input commands for operation. One suitable type of application is the command and control application where discrete commands are issued to cause a particular function to occur. As possible examples, the application 22 might be a program to operate a vehicle radio, or a program to locate an address or destination, or a program to operate a telephone, or a program to open files on a computer, and so forth.

The vocabulary 24 is the complete list of utterances that are recognized by the application 22. The vocabulary 24 is stored in memory that can be accessed by the application. The active grammar 26 is a subset of the vocabulary that the recognition system is attempting to recognize at any one time. During operation, the application 22 extracts various sets of utterances from vocabulary 24 and registers them as the active grammar. The active grammar 26 is stored in short-term memory or cache, which is accessible by the application 22 and the speech recognition engine 26.

The speech recognition engine 28 performs the actual task of recognizing utterances in the active grammar. It compares the voice input from the operator with utterances in the active grammar 26. Upon detection of an utterance listed in the active grammar 26, the speech recognition engine 28 informs the application of the particular utterance that has been recognized. The application 22 then performs the function associated with the utterance.

The user interface 30 combines audible and visual feedback to inform a user when the system 20 is expecting a voice command. The audible feedback is in the form of different tones that indicate different response actions on the part of the system 20. The visual feedback provides at-a-glance interpretation of how long the system will or has been listening for a voice command. The user interface 30 improves user interaction with the speech recognition system 20 by conveying to the user that the system is actively listening for a recognizable utterance or has heard and understood a recognizable utterance.

The speech recognition system 20 begins with a starter word to initially activate the system for further voice inputs. Using a starter word helps narrow initiation of the system to only those instances that the user actually wants to open a dialog with the system. Other words spoken by the user or by others in background (e.g., words from a radio or TV broadcast, or from a passerby, etc.) will rarely trigger initiation of the system. For instance, suppose the starter word is "WAKE". In the absence of the "WAKE" command, the system 20 remains in its sleep or dormant state.

Alternatively, the system may be activated through a hardware control. The device may include a "Push to Talk" or "PPT" button that, upon depression, wakes up the system.

When it recognizes the command "WAKE" or detects actuation of the Push to Talk button, the speech recognition system 20 awakes to its active state and becomes ready to receive further audible input commands. The user interface 30 emits a first tone or other sound signifying to the user that the system recognizes the wake up command. Concurrently, the user interface 30 displays an onscreen countdown graphic to provide additional visual feedback that the system is awake.

Once active, the speech recognition system 20 waits for a predetermined duration for another recognizable command. The countdown graphic visually decrements with passage of time. If the user chooses to glance at the display, the countdown graphic informs the user quickly as to approximately how much time is left to say a command.

Each time the user speaks a word that is recognized, the user interface 30 plays a second tone or sound to confirm recognition of the word and restarts the countdown graphic. If the user stops providing commands and the predetermined duration lapses, the countdown graphic visually decrements until it disappears entirely and the user interface sounds a third tone indicating that the response time has elapsed. The speech recognition system returns to its dormant state and begins listening for the starter word.

The discrete speech recognition system 20 can be implemented in many different contexts. Three exemplary contexts are provided in this disclosure: an vehicle computer/entertainment accessory, a standalone computing device, and networked computing devices. These implementations are discussed separately below.

Exemplary Context 1: Vehicle Accessory

Figure 2:
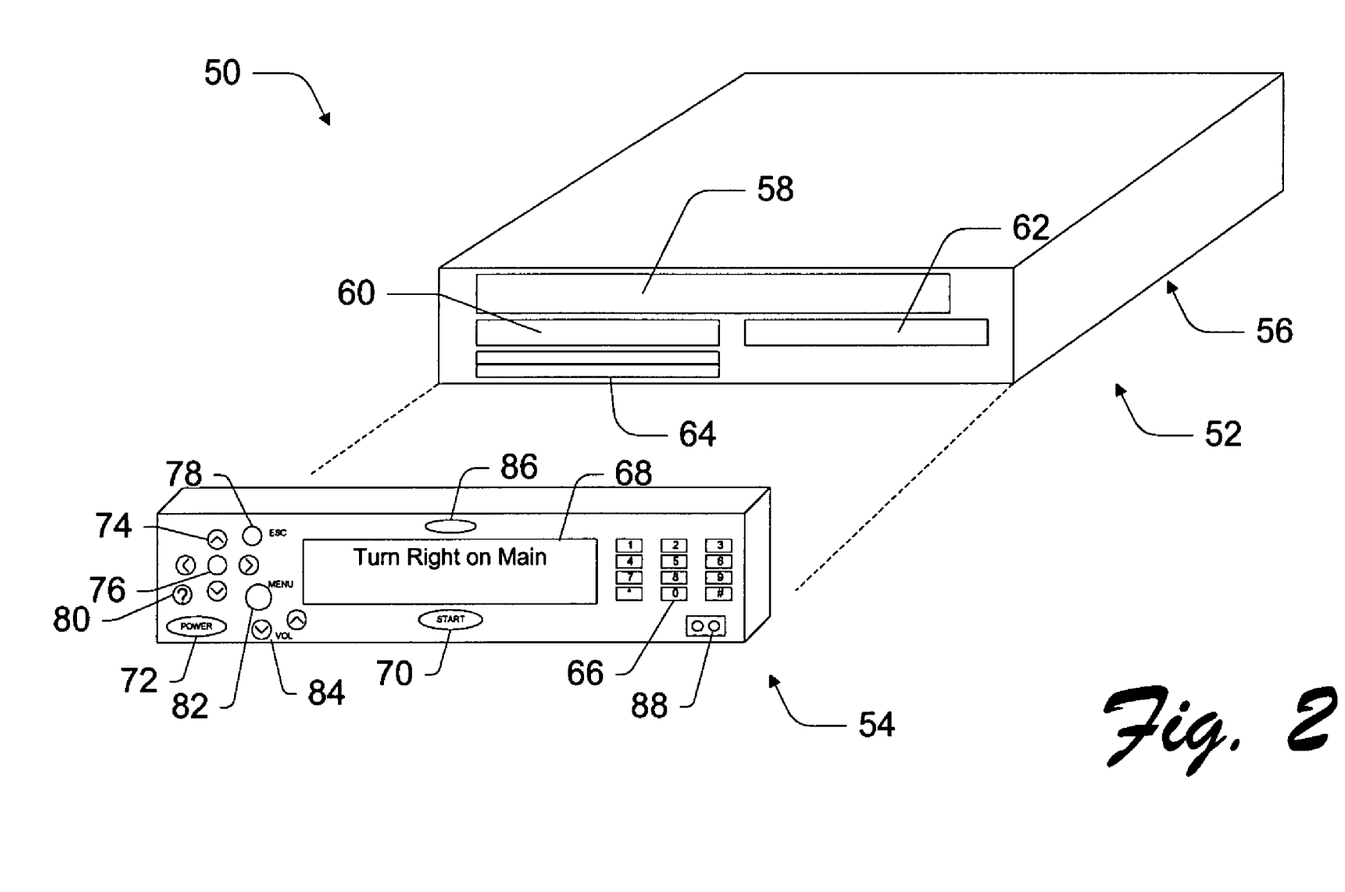
FIG. 2 is a diagrammatic illustration of a vehicle computer system that implements the discrete speech recognition system.

FIG. 2 shows an in-dash vehicle accessory 50 that implements the discrete speech recognition system 20. In the illustrated implementation, the vehicle accessory 50 is a vehicle computer system that includes a variety of different elements such as a security subsystem, a navigation subsystem, and an entertainment subsystem. In other embodiments, the accessory might be a car radio, cassette player, CD player, or similar device. The speech recognition system facilitates voice activation of the accessory 50, or features thereof, to permit the driver to verbally enter commands in a hands-free, eyes-free environment.

Vehicle accessory 50 has a base module 52 and a detachable faceplate 54. Base module 52 includes a housing 56, which is sized to be mounted in a vehicle dashboard similar to a conventional car stereo. Preferably, housing 56 has a form factor of a single DIN (Deutsche Industry Normen). The base module could alternatively be housed in a 2 DIN unit or other special form factor for an OEM.

In the described implementation, base module 52 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components.

The computer 52 includes at least one storage drive that permits the vehicle user to download programs and data from a storage medium. In the illustrated implementation, the computer 52 has a CD ROM drive 58 that reads application-related CDs, as well as musical, video, game, or other types of entertainment CDs. In this manner, the CD ROM drive 58 performs a dual role of storage drive and entertainment player. Also, a hard disk drive (not shown in FIG. 4) that can be used for storing both application programs and user data is included on the computer module 52. The computer base module 52 has an optional 3.5" floppy diskette drive 60, a smart card reader 62, and dual PCMCIA card sockets 64 which accept PC (or PCMCIA) card types II and III. The faceplate 54 can be rotated to expose and permit easy access to the storage drives. In other implementations, the faceplate 54 has slots to permit access to one or more of the memory drives.

Faceplate 54 has a keypad 66 and a graphical display 68. The display 68 is preferably a backlit LCD having a rectangular array of pixels that are individually selectable for illumination or display. The display element is a medium-resolution, bit-mapped display system having at least 10,000 pixels. In the described implementation, the array of pixels has a size of at least 64 by 256 pixels. The operating system of base module 52 interacts with faceplate keypad 66 and faceplate display 68 as peripheral devices when the faceplate 54 is attached to the base module 52.

The faceplate 54 has a start button 70 that provides the familiar "Start" functions of a Windows brand operating system. The faceplate 54 also has a power button 72, a four-position actuator 74, an "enter" button 76, an "escape" button 78, a "help" button 80, a "menu" button 82, and a volume control input 84.

The accessory 50 has a voice input port 86 that picks up voice commands for entry to the speech recognition system. The accessory also supports an IrDA (infrared developers association) transceiver port 88 mounted on the faceplate 54 to transmit and receive data and programs using infrared signals.

The vehicle accessory 50 can be used to integrate multiple vehicle-related systems onto one open platform. For instance, the accessory can serve as a multimedia entertainment system, a navigation system, a communications system, a security system, and a diagnostics system. Moreover, the accessory provides additional functionality traditionally associated with desktop and laptop personal computers. For instance, it can support word processing applications, spreadsheet applications, database applications, and appointment/schedule applications. Furthermore, the vehicle accessory 50 can be configured to operate as a server to other computing units in a vehicle to distribute games, video movies, and the like to passengers.

Vehicle accessory 50 may support a number of components and features that are not discussed herein. For more detail regarding such features refer to a U.S. Pat. No. 5,794,164, entitled "Vehicle Computer System", which was issued Aug. 11, 1998 and is assigned to Microsoft Corporation. This patent is hereby incorporated by reference.

Figure 3:
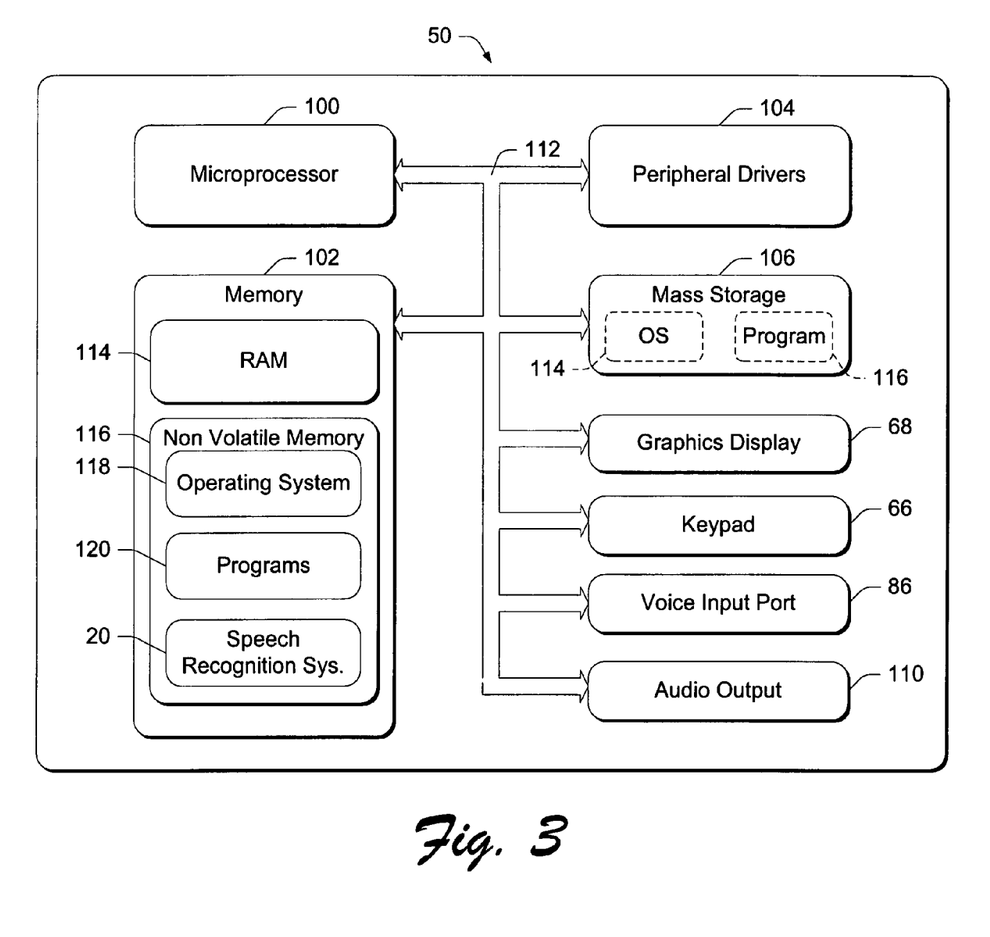
FIG. 3 is a block diagram of the vehicle computer system of FIG. 2.

FIG. 3 is a simplified block diagram showing pertinent components of vehicle accessory 50. It has a conventional computer architecture, including a microprocessor 100, associated addressable memory 102, peripheral drivers 104, and optional mass storage 106. In addition, accessory 50 includes keypad 66, a graphics display 68, a voice input port 86, and an audio output 110 to permit emission of sound. The various components communicate internally through a parallel data bus 112. The audio output can be configured as a sound or tone generator integrated into the stereo functionality, or be.

The addressable memory 102 is shown to include high-speed volatile memory 114 and non-volatile memory 116. An operating system 118 and one or more programs 120 are stored in memory 116 and execute on the microprocessor 100. Alternatively, the operating system and programs can be stored in mass storage 106 (as represented by the dashed boxes). Other components, not shown, provide different types of entertainment functionality as described in the patent cited above.

In the illustrated implementation, the speech recognition system 20 is embodied as a computer program or callable modules that are stored in memory 116 and executed on microprocessor 100. Voice commands are entered into the vehicle computer via the voice input 86. The speech recognition system 20 receives voice commands and performs functions based upon recognized commands. Visual and audible feedback forming the user interface 30 are implemented by the display 68 and audio output 110.

The data processor 100 is programmed by means of instructions stored at different times in the various computer-readable storage media of the device. Programs are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps and features described below in conjunction with a microprocessor or other data processor. The invention also includes the computer and other devices themselves when programmed according to the methods and techniques described below.

Vehicle accessory 50 can be used to integrate multiple vehicle-related systems onto one open platform. For instance, the system can serve as a multimedia entertainment system, a navigation system, a communications system, a security system, and a diagnostics system. Moreover, the system provides additional functionality traditionally associated with desktop and laptop personal computers. For instance, with the addition of a peripheral display device it can support word processing applications, spreadsheet applications, database applications, and appointment/schedule applications. Furthermore, the vehicle computer system 50 can be configured to operate as a server to other computing units in a vehicle to distribute games, video movies, and the like to passengers.

Exemplary Context 2: Computing Device

Figure 4:
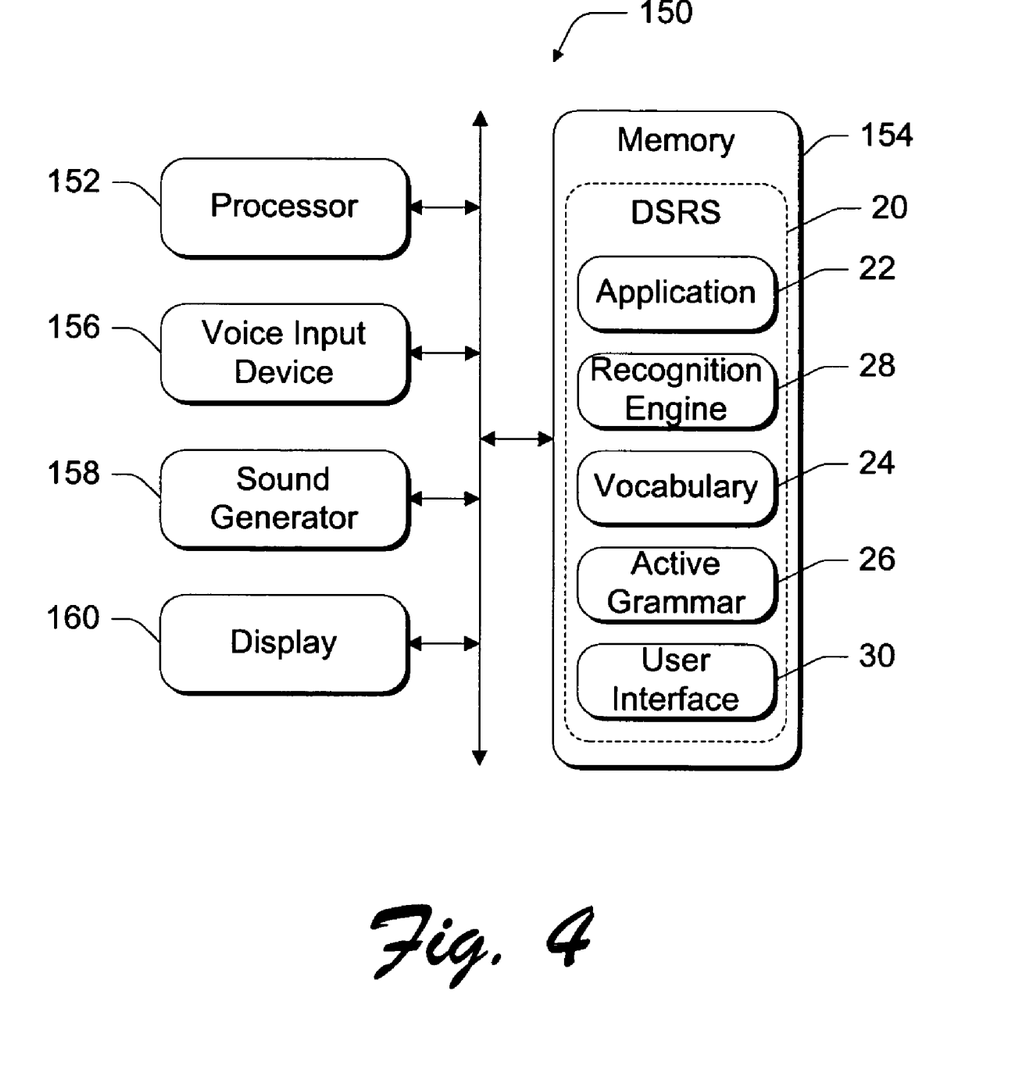
FIG. 4 is a block diagram of a more general computer device used to implement the speech recognition system.

The speech recognition system 20 may be implemented in devices other than a vehicle accessory. To provide another example for discussion purposes, FIG. 4 is a simplified block diagram of a computing device 150 that implements the discrete speech recognition system (DSRS) 20. The computing device 150 has a processor 152, associated addressable memory 154 (including non-volatile memory and high-speed volatile memory), a voice input device 156, a sound generator 158, and a display 160. The speech recognition system 20 is embodied as a software or firmware program stored or embedded in memory 154 and executes on the processor 152. The speech recognition program 20 has an application 22, a predefined vocabulary 24, an active grammar 26, a recognition engine module 28, and a user interface 30.

The computer device 150 is representative of many diverse products. Examples of representative products include pagers, cellular phones, handheld personal information devices, stereos, VCRs, set-top boxes, calculators, appliances, and so forth. It may also represent computers such as desktop computers, laptop computers, handheld computers, and other types of computer-based products.

Exemplary Context 3: Networked Computing Devices

The speech recognition system 20 may be implemented in multiple devices that are interconnected via a network (e.g., telephone, cable, Internet, LAN, WAN, etc.). Each device can be implemented as shown in FIG. 4, but adapted with a network port to facilitate communication with other devices over a network. This architecture forms a collaboration system in which multiple users are allowed to collaborate from remote locations. This architecture is representative of teleconferencing, video conferencing, and other collaboration-centric systems.

The speech recognition system is implemented at each node. The system provides visual and auditory feedback to help a person know when it is his/her turn to speak and when his/her turn is about to "time out".

Operation of Speech Recognition User Interface

Figure 5:
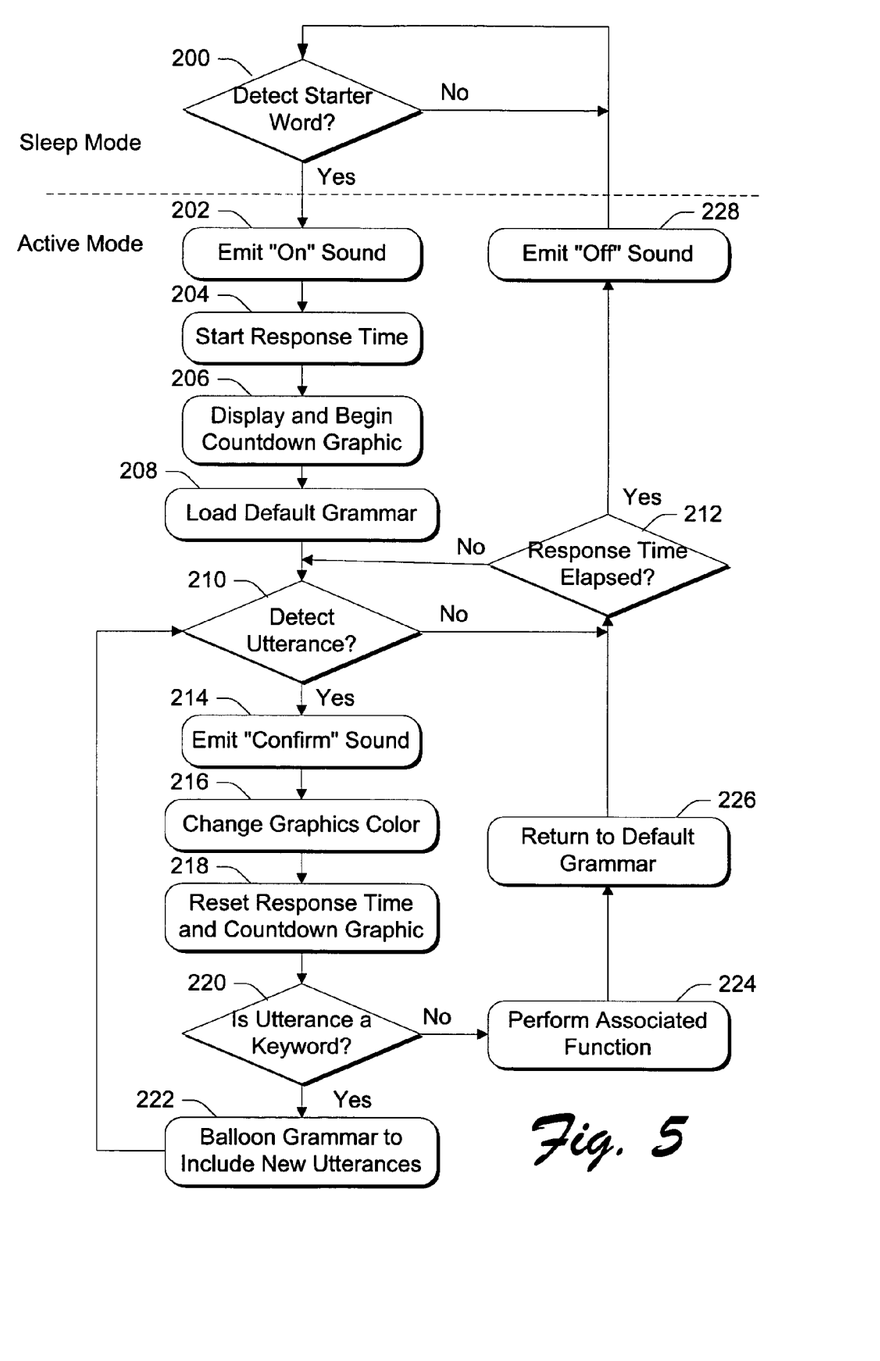
FIG. 5 is a flow diagram showing steps in a method for operating a speech recognition system.

FIG. 5 shows steps in a method for operating the speech recognition system in a manner that improves human interaction with the system. The process is described with additional reference to an exemplary grammar context illustrated of FIG. 6 and an exemplary graphical interface shown in FIGS. 7a–7d.

At step 200 in FIG. 4, the speech recognition system 20 continually listens for a starter command, such as "WAKE". Essentially, the active grammar at this point is loaded only with the starter word "WAKE" during the sleep mode, as indicated by grammar 250 in FIG. 6. Until it hears the starter word "WAKE" (i.e., the "no" branch from step 200), the system 20 remains in sleep mode with sufficient resources left operating to listen for the starter word. The user may wake up the system at any time by speaking the starter word "WAKE" into the voice input port 86 (or 156).

Upon speaking the starter word "WAKE", the speech recognition engine 28 recognizes the starter word (i.e., the "yes" branch from step 200) and the user interface emits a distinctive "on" tone or sound from the audio output 110 or sound generator 158 (step 202). The audio feedback immediately indicates to the user that the system heard and understood the starter command and is now awake and actively listening for the next command. The audible feedback may be in the form of one or more tones, or a spoken reply like "Computer is Active".

The speech recognition system 20 starts a response time in which it expects to hear a next command from the user (step 204 in FIG. 5). As an example, the response time might be ten seconds, meaning that the user has ten seconds from the time of the first tone to speak the next command. The response time is configurable, allowing the user to set it to any desired duration. The speech recognition user interface 30 displays an onscreen countdown graphic to provide additional visual feedback that the system is awake (step 206 in FIG. 5). The countdown graphic visually changes with passage of time so that the user quickly ascertains how much time is left to respond.

Figure 7A:
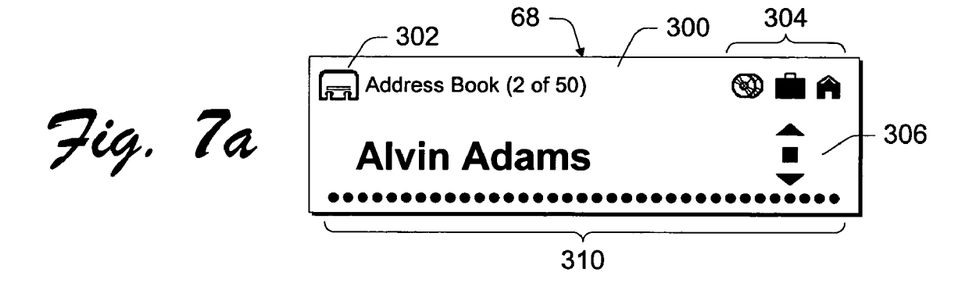
FIGS. 7a–7c illustrates a graphical interface having a countdown graphic to provide visual feedback pertaining to response duration.

FIG. 7a shows a graphical interface 300 illustrating one exemplary implementation of the countdown graphic. The visual interface 300 is shown displayed on the vehicle computer screen 68 (or device display 160). In this example, the graphical user interface 300 exposes an address book application, as indicated by the address card icon 302. The address book application organizes and maintains personal information (e.g., address, telephone number, fax number, email address, etc.). Here, the user interface 300 lists the name "Alvin Adams". Other available applications are represented by icons 304. The graphical user interface 300 further includes a navigation glyph 306 at one end of the screen to assist the user with navigating the interface.

Figure 7B:
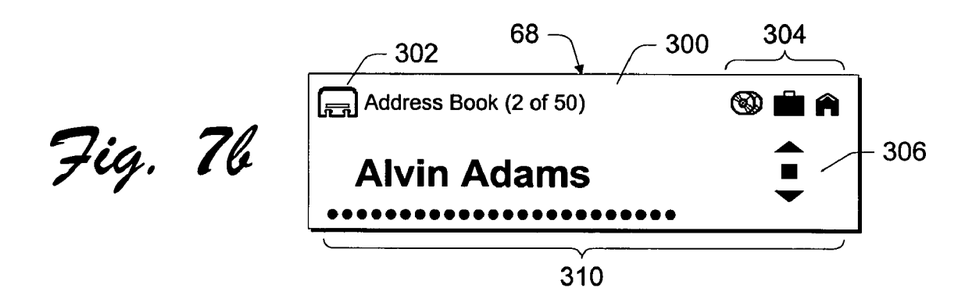
Figure 7C:
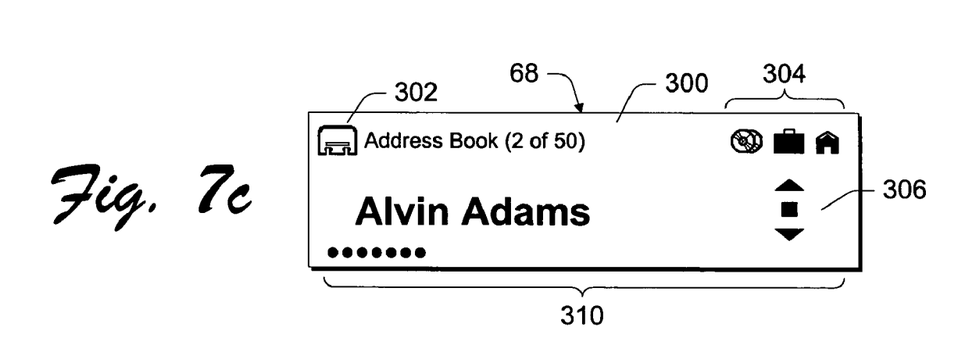

A countdown graphic 310 is formed along the bottom of the interface 300 as an elongated progress bar. As time runs out, the countdown graphic 310 shortens in appearance proportionately to the amount of time that has passed. FIG. 7b shows the countdown graph 310 after approximately three seconds has elapsed from a previous tone. FIG. 7c shows the countdown graph 310 after approximately eight seconds has elapsed from a previous tone.

At step 208 in FIG. 5, the application 22 in the speech recognition system 20 extracts a default grammar from the vocabulary 24 and loads the default grammar into the active grammar 26. For purpose of continuing discussion, suppose the discrete speech recognition system 20 is implemented to control an address book program implemented by the vehicle computer/entertainment accessory 50 or the computing device 150. It is noted that the speech recognition system can be used to control many other functions in addition to an address book. Other controllable functions include operating a radio or stereo parameters, adjusting temperature control, operating a cellular phone, operating a CD player, locking and unlocking doors, lowering and raising windows, and so forth.

Figure 6:
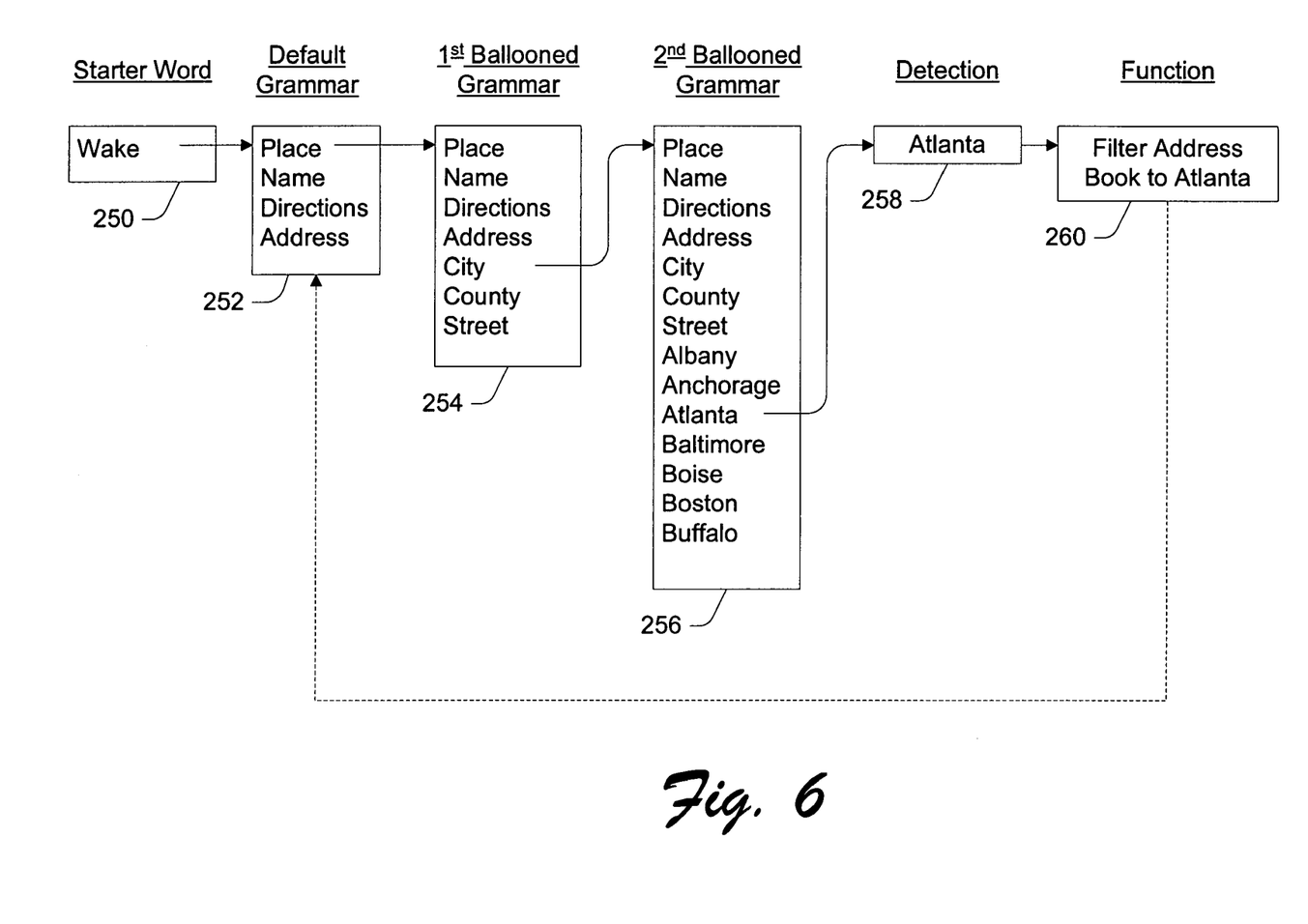
FIG. 6 illustrates how a default grammar is expanded multiple times to create multiple ballooned grammars during operation.

The default active grammar, referenced by number 252 in FIG. 6, contains four utterances: "Place", "Name", "Directions", and "Address". Table 1 contains the default grammar and associated functions.

TABLE 1

Default Grammar 252

| Word/Phrase | Command Function |
| --- | --- |
| Place | Keyword to place menu |
| Name | Sets address book to specified name. |
| Directions | Keyword to Directions menu |
| Address | Keyword to address menu |

The first, third, and fourth utterances—"Place", "Directions", and "Address"—are keyword utterances and the second—"Name"—is a non-keyword utterance. Keyword utterances are used to balloon the active grammar to include utterances in addition to the default grammar.

At step 210 in FIG. 5, the speech recognition engine 28 begins listening to speech patterns in an effort to detect an utterance contained in the default grammar 252. The recognition engine 28 continues to listen for the preset response time (i.e., ten seconds), as indicated by the loop containing the "no" branch from step 210, the decision step 212 and the "no" branch from step 212. If the recognition engine 28 fails to hear an utterance from the default grammar (or any current grammar) within the prescribed response time (i.e., the "no" branch from step 210 and the "yes" branch from step 212 in FIG. 5), speech recognition system emits distinctive "off" tone or sound from the audio output 110 or sound generator 158 (step 228). This audible sound indicates that the system is returning to its sleep mode and will require restatement of the starter word to awaken the device. Concurrently, the countdown graphic disappears to provide a visual indication that the time has run out.

When the recognition engine 28 detects an utterance from the default grammar (i.e., the "yes" branch from step 210), the speech recognition user interface 30 provides three different affirmations that the system 20 heard and understood the command. The first affirmation is the emission of a distinctive "confirm" tone or sound from the audio output 110 or sound generator 158 (step 214). The speech recognition user interface 30 also briefly changes the color of the graphical display 300 from one color to another color to provide a visual affirmation that the command was correctly detected (step 216). The graphics are returned to their normal color after a preset duration (e.g., one-two seconds). The third affirmation is the resetting of the countdown graphic to its initial state, such as the full-length bar 310 in FIG. 7a (step 218).

At step 220 in FIG. 5, the speech recognition system determines whether the utterance represents a keyword in the application. If the user speaks the keyword such as "Place" (i.e., the "yes" branch from step 220), the speech recognition system temporarily expands the default grammar to include an additional set of utterances triggered by the keyword (step 222 in FIG. 5). In this case, the extra utterances are location-related terms, "City", "County", and "Street", as shown in grammar 254 of FIG. 6. Table 2 lists the ballooned grammar.

TABLE 2

Ballooned Grammar 254

| Word/Phrase | Command Function |
| --- | --- |
| Place | Keyword to place menu |
| Name | Sets address book to specified name. |
| Directions | Keyword to Directions menu |
| Address | Keyword to address menu |
| City | Keyword to list of cities |
| County | Keyword to list of counties |
| Street | Keyword to list of streets |

The process returns to the utterance detection step 210 in FIG. 5. Suppose that the user next speaks the word "City", which is also a keyword, within the prescribed response time. When the speech recognition engine 28 detects the keyword "City" (step 102 in FIG. 6), it emits a "confirm" tone, changes the graphics color, and restarts the countdown graphic (steps 214–218). Since "City" is also a keyword, the first ballooned grammar is further expanded to a second ballooned grammar 256 that adds the names of various U.S. cities, such as "Albany", "Anchorage", "Atlanta", "Baltimore", "Boise", "Boston", "Buffalo", and so forth (step 222). The second ballooned grammar 256 thus contains the original words in the default grammar 252, the added words in the first ballooned grammar 254, and the new city names.

Suppose the user says the word "Atlanta" within the response time. The speech recognition system recognizes the utterance "Atlanta" (i.e., the "yes" branch from step 210), as represented by numeral 258 in FIG. 6. With this recognition, the speech recognition UI 30 once again emits a "confirm" tone, changes the graphics color, and restarts the countdown graphic. In this case, however, the utterance is not a keyword (i.e., the "no" branch from step 220 in FIG. 5). Accordingly, at step 224 in FIG. 5, the system performs the associated function of filtering the address book to entries pertaining to the city Atlanta, as represented by number 260 in FIG. 6.

After the associated operation is performed, the speech recognition system returns to the small default grammar (step 226 in FIG. 5). This is represented diagrammatically in FIG. 6 by the dashed return arrow to the default grammar 252. The speech recognition user interface is advantageous because it provides both auditory and visual feedback concerning the state of the speech recognition system. The distinctive tones and countdown graphic informs the user as to whether the system is awake or asleep, and if awake, how much time is left to speak a command before the system goes dormant again. The visual portion is designed to give quick information at a glance so that users, such as vehicle drivers, need not concentrate for any significant time period to discern whether the system is awaiting a response and there is still time to give one.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A speech recognition system comprising:
  a speech recognition engine to recognize an utterance, the speech recognition engine being configured to actively listen for the utterance for a predetermined response time, the speech recognition engine being configured to enter a dormant state if the utterance is not recognized within the predetermined amount of time, the speech recognition system remaining in the dormant state until recognition of a starter word that is independent of the utterance; and a user interface to provide visual and auditory feedback indicating whether the speech recognition engine recognizes the utterance, the user interface being configured to: (a) play an audible sound indicating recognition of the utterance; (b) display a countdown graphic that changes with lapsing of the predetermined response time; (c) restart the countdown graphic in the event the speech recognition engine recognizes the utterance.

2. A speech recognition system as recited in claim 1, wherein the response time is configurable.

3. A speech recognition system as recited in claim 1, wherein the user interface displays visual elements in a first color and briefly changes to a second color in the event the speech recognition engine recognizes the utterance.

4. A speech recognition system as recited in claim 1, wherein the countdown graphic comprises a progress bar that shortens as the response time diminishes.

5. A speech recognition system as recited in claim 1, wherein the user interface plays another audible sound when the response time has elapsed.

6. A speech recognition system as recited in claim 1, wherein the speech recognition engine is initially in a sleep mode and is awakened to an active mode upon detection of a starter utterance, the user interface plays another audible sound indicating that the speech recognition engine is in the active mode in the event the speech recognition engine recognizes the starter utterance.

7. A speech recognition system as recited in claim 1, wherein the speech recognition engine is initially in a sleep mode and is awakened to an active mode upon depression of a button, the user interface plays another audible sound indicating that the speech recognition engine is in the active mode in the event the speech recognition engine recognizes a starter utterance.

8. A speech recognition system comprising:
an application;
a vocabulary accessible by the application, the vocabulary holding a set of utterances applicable to the application;
a grammar that holds a subset of the utterances in the vocabulary;
a speech recognition engine to recognize the utterances in the grammar within a predetermined response time, the speech recognition engine being configured to enter a dormant state if the utterances are not recognized within the predetermined response of time; and
a user interface to display a countdown graphic that changes with lapsing of the response time, wherein the user interface restarts the countdown graphic in the event the speech recognition engine recognizes the one of the utterances.

9. A speech recognition system as recited in claim 8, wherein the user interface displays visual elements in a first color and briefly changes to a second color in the event the speech recognition engine recognizes one of the utterances.

10. A speech recognition system as recited in claim 8, wherein the countdown graphic comprises a progress bar that shortens as the response time diminishes.

11. A speech recognition system as recited in claim 8, wherein the user interface plays an audible sound when the speech recognition engine recognizes one of the utterances within the predetermined response time.

12. A speech recognition system as recited in claim 8, wherein the user interface plays an audible sound when the response time has elapsed.

13. A speech recognition system as recited in claim 8, wherein the speech recognition engine is initially in a sleep mode and is awakened to an active mode upon detection of a starter utterance, the user interface plays another audible sound indicating that the speech recognition engine is in the active mode in the event the speech recognition engine recognizes the starter utterance.

14. An entertainment system incorporating the speech recognition system as recited in claim 8.

15. A computing device incorporating the speech recognition system as recited in claim 8.

16. A user interface for an speech recognition system, the user interface comprising:
a display; and
a graphic progress bar shown on the display that indicates a response time in which the speech recognition system is awaiting a user to speak, the progress bar shortening with passage of the response time, wherein the graphic progress bar is lengthened to its initial position after each recognized user input, wherein the user interface plays an audible sound when the speech recognition engine recognizes one of the utterances within the predetermined response time, and wherein the user interface indicates that the speech recognition engine is in a dormant state when at least one of the utterances is not recognized within the predetermined response of time.

17. A user interface as recited in claim 16, wherein the graphic progress bar briefly changes color when a user input is recognized.

18. A speech recognition system incorporating the user interface as recited in claim 16.

19. A computing device incorporating the user interface as recited in claim 16.

20. A user interface for an speech recognition system, the user interface comprising:
a display;
an audio input to receive audible utterances;
a graphic shown on the display that indicates a fixed response time in which the speech recognition system is awaiting receipt of an utterance via the audio input, the graphic diminishing in size with the passage of time, the graphic returning to an original size after each recognized utterance; and
an audio generator to emit a first audible sound when the speech recognition system recognizes the utterance, the audio generator being further configured to emit a second audible sound when the fixed response time has expired before the utterance has been recognized, the second sound indicating that the speech recognition system has entered a dormant state.

21. A user interface as recited in claim 20, wherein the audio generator emits a second audible sound when the speech recognition system fails to recognize the utterance within the response time.

22. A speech recognition system incorporating the user interface as recited in claim 20.

23. A computing device incorporating the user interface as recited in claim 20.

24. A vehicle computer system comprising:
a computer;
an open platform operating system executing on the computer, the operating system being configured to support multiple applications; and a speech recognition system to detect utterances used to control at least one of the applications running on the computer, the speech recognition system having a user interface to provide visual and auditory feedback indicating whether an utterance is recognized, the user interface being configured to play a first audible sound indicating recognition of the utterance and to display a graphic that diminishes in size from an original size with the passage of time, the graphic returning to the original size after each recognized utterance, the user interface being further configured to emit a second audible sound when a predetermined response time has expired before the utterance has been recognized, the second sound indicating that the speech recognition system has entered a dormant state.

25. A vehicle computer system as recited in claim 24, wherein the user interface restarts the graphic in the event the utterance is recognized.

26. A vehicle computer system as recited in claim 24, wherein the user interface displays visual elements in a first color and briefly changes to a second color in the event the utterance is recognized.

27. A vehicle computer system as recited in claim 24, wherein the graphic comprises a progress bar that shortens as the response time passes.

28. A vehicle computer system as recited in claim 24, wherein the user interface plays another audible sound when the response time has elapsed.

29. A vehicle computer system as recited in claim 24, wherein the speech recognition system is initially in a sleep mode and is awakened to an active mode upon detection of a starter utterance, the user interface plays another audible sound indicating that the speech recognition system is in the active mode in the event the starter utterance is recognized.

30. A collaboration system involving multiple interconnected devices comprising:
   a voice input mechanism resident at each of the devices;
   an audio output system resident at each of the devices; and
   a user interface to provide visual and auditory feedback indicating when a party located at one of the devices can speak, the user interface being configured to play an audible sound when the party can begin speaking and to display a graphic that changes with lapsing of time to indicate a duration that the party can speak, the graphic diminishing in size from an original size with the passage of time, the graphic returning to the original size after each recognized utterance, wherein the user interface plays an audible sound upon recognizing an utterance within the duration that the party can speak, the user interface emitting a second audible sound when the duration has expired before the utterance has been recognized, the second sound indicating that the speech recognition system has entered a dormant state.

31. A method for operating a speech recognition system, comprising the following steps:
   initiating a response time in which to receive an audible utterance;
   displaying a graphic representing the response time;
   playing a first sound when an audible utterance is recognized;
   changing the graphic to indicate passage of the response time such that the graphic diminishes in size from an original size with the passage of time;
   responsive to recognizing an utterance, presenting the graphic in the original size; and
   responsive to expiration of the response time before the audible utterance has been recognized, emitting a second sound to indicate that the speech recognition system has entered a dormant state.

32. A method as recited in claim 31, wherein the displaying and changing steps comprise the steps of depicting a progress bar and shortening the progress bar as the response time passes.

33. A method as recited in claim 31, further comprising the step of changing a color of the graphic when an audible utterance is recognized.

34. A method as recited in claim 31, further comprising the step of playing a sound when no audible utterance is recognized within the response time.

* * * * *

UNITED STATES PATENT AND TRADEMARK OFFICE
CERTIFICATE OF CORRECTION

| | | |
|---|---|---|
| PATENT NO. | : 6,965,863 B1 | Page 1 of 1 |
| APPLICATION NO. | : 09/191047 | |
| DATED | : November 15, 2005 | |
| INVENTOR(S) | : Sarah E. Zuberec et al. | |

It is certified that error appears in the above-identified patent and that said Letters Patent is hereby corrected as shown below:

In column 3, line 65, after "application" insert -- 22 --.

In column 4, line 22, after "application" insert -- 22 --.

Signed and Sealed this

Eighth Day of September, 2009

David J. Kappos
*Director of the United States Patent and Trademark Office*